US011972694B2

(12) United States Patent
Sasidhar et al.

(10) Patent No.: US 11,972,694 B2
(45) Date of Patent: *Apr. 30, 2024

(54) SYSTEM AND METHOD FOR IMPROVING PERSONALITY TRAITS

(71) Applicant: DHARMA LIFE SCIENCES LLC, Sleepy Hollow, NY (US)

(72) Inventors: Jonnalagadda Sasidhar, Sleepy Hollow, NY (US); Gowthami Vasudev, Bangalore (IN); Manisha Naresh Nagpal, Bangalore (IN)

(73) Assignee: DHARMA LIFE SCIENCES LLC, Sleepy Hollow, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/950,679

(22) Filed: Sep. 22, 2022

(65) Prior Publication Data

US 2023/0111412 A1  Apr. 13, 2023

Related U.S. Application Data

(63) Continuation of application No. 16/056,124, filed on Aug. 6, 2018, now Pat. No. 11,455,906, which is a continuation of application No. 14/549,536, filed on Nov. 20, 2014, now abandoned.

(51) Int. Cl.
  *G09B 19/00* (2006.01)
(52) U.S. Cl.
  CPC .................................. *G09B 19/00* (2013.01)

(58) Field of Classification Search
  CPC ........................................................ G09B 19/00
  USPC ........................................................... 434/236
  See application file for complete search history.

(56) References Cited

U.S. PATENT DOCUMENTS

2013/0101970 A1* 4/2013 Mascarenhas ......... G06Q 30/02
                                                              434/236
2015/0193400 A1* 7/2015 Puvanachandran ...... G09B 5/00
                                                              715/234

OTHER PUBLICATIONS

Schwabe Williamson & Wyatt, PC, "Listing of Related Cases"; Apr. 21, 2023; 1 page.

* cited by examiner

*Primary Examiner* — Sibte H Bukhari
(74) *Attorney, Agent, or Firm* — Schwabe Williamson & Wyatt

(57) ABSTRACT

A system for improving personality traits is provided. The system includes at least one processor configured to provide an option to a user for selecting at least one personality trait from a plurality of personality traits. The processor is also configured to suggest at least one alternate personality trait for selection based on the personality trait selected by the user, and allow selection of at least one of the suggested alternate personality traits or proceed with the earlier selection. The processor is further configured to suggest one or more actions based on the personality trait selected by the user, wherein the action is to cause an improvement in the selected personality trait of the user.

14 Claims, 8 Drawing Sheets

SYSTEM AND METHOD FOR IMPROVING PERSONALITY TRAITS

CROSS-REFERENCE TO RELATED APPLICATIONS

This application is a continuation of U.S. patent application Ser. No. 16/056,124, filed on Aug. 6, 2018, which is a continuation of U.S. patent application Ser. No. 14/549,536, filed on Nov. 20, 2014, which are all incorporated by reference in their entirety.

BACKGROUND

Field

The subject matter in general relates to personality traits. More particularly, but not exclusively, the subject matter relates to a technical solution for improving personality traits.

Discussion of Related Art

Human beings have several limitations that may hold them back from achieving their full potential. Some of these limitations relate to limitations in their personality traits, and may be existent by reason of the environment they are subjected to and/or their genes. It is well known that overcoming these limitations may enable one to lead a more rewarding life. Hence, research has been ongoing to find solutions that may enable one to overcome limitations associated with their personality traits.

Conventionally, a person who thinks he has some deficiency in his personality trait may approach a medical professional, who may provide instructions to address the issue. However, the person has to be self motivated to follow all the instructions diligently. Many might lack the required motivation to follow the instructions.

On the other hand, some may be hesitant to discuss issues concerning their personality traits, and hence may not even seek professional help. In such cases, there is a possibility that their condition may deteriorate further.

In many instance one may not seek professional help because they may think that the issue relating to their personality trait may not be serious enough to seek professional help. However, addressing the issues relating to such traits as well might lead to a more rewarding life.

In light of the foregoing discussion, there is a need for a technical solution that may enable a person address issues concerning his personality traits.

SUMMARY

An embodiment provides a system for improving personality traits. The system includes at least one processor configured to provide an option to a user for selecting at least one personality trait from a plurality of personality traits. The processor is also configured to suggest at least one alternate personality trait for selection based on the personality trait selected by the user, and allow selection of at least one of the suggested alternate personality traits or proceed with the earlier selection. The processor is further configured to suggest one or more actions based on the personality trait selected by the user, wherein the action is to cause an improvement in the selected personality trait of the user.

Another embodiment provides a system for improving personality traits. The system includes at least one processor configured to suggest one or more actions to cause an improvement in a personality trait of a user, and determine change in status of the personality trait based on user defined position of a status of the personality trait, actions performed by the user among the suggested actions, effectiveness of the actions performed by the user on the personality trait and deterioration of impact of the actions on the personality trait.

Yet another embodiment provides a method for improving personality traits. The method includes providing a digital scale operable by a user to select a position on the scale, wherein the position is indicative of the user's perception of his character corresponding to the selected personality trait. The method further includes determining a current status of the personality trait at least based on the user selected position on the scale and actions performed by the user, and allowing the user to alter the determined current status of the personality trait. Further, the method includes calibrating future determination of the status of the personality trait based on difference between the determined current status and the status altered by the user.

BRIEF DESCRIPTION OF DRAWINGS

Embodiments are illustrated by way of example and not limitation in the Figures of the accompanying drawings, in which like references indicate similar elements and in which:

FIG. 3A illustrates a user interface 112 that enable a user to enter a search query for selecting a trait he wishes to work on;

DETAILED DESCRIPTION

Figure 1:
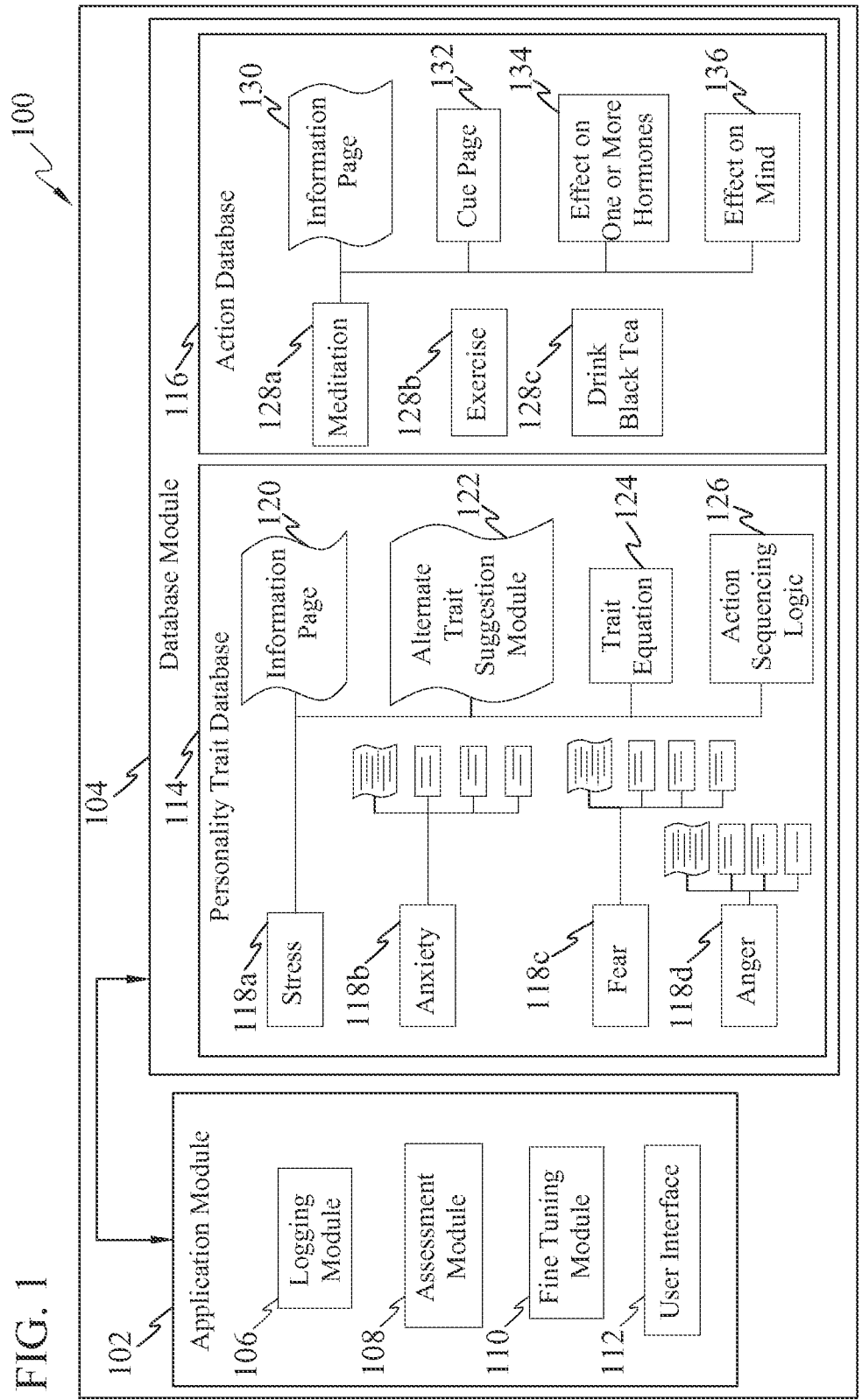
FIG. 1 is a block diagram of a system 100 for improving personality traits, in accordance with an embodiment.

A system and method are provided for improving personality traits. The system may include an application executed by at least one processor configured to provide an option to a user for selecting at least one personality trait from a plurality of personality traits. The personality trait may be a positive trait, or a negative trait. For example, the user may be experiencing a negative trait such as "stress". The user may select "stress" as a personality trait to be improved. The application upon receiving the input from the user, provides information pertaining to "stress". Further, the application may suggest alternate traits for selection. The alternate traits may be "anxiety" and "worry", which may be closely related to or capable of being confused with the initially selected trait "stress". The user may selects at least one of the alternate traits suggested or may proceed with initially selected trait "stress". The application further provides a scale which is operable by the user to select a position on the scale. The position may indicate the user's perception of his character corresponding to the selected trait. The application is further configured to suggest actions to be performed by the user to improve the selected trait. The action suggested may be associated with at least one of a physical action, a mind action, a dietary action and a brain action. The user upon performing an action, may log the action in the application. The application uses the log to determine the status of the selected trait, and may reflect the status on the scale. The application may also consider deterioration of impact of the performed actions on the personality trait to determine the status of the trait, at any instance, and reflect the status on the scale. The application may be further configured to allow a user to alter the position of the status of the trait on the scale, as per his perception. The application may consider the difference between the altered position and the position computed by the application to reconfigure the effectiveness of one or more actions on the trait for future computation of status of the trait.

The following detailed description includes references to the accompanying drawings, which form part of the detailed description. The drawings show illustrations in accordance with example embodiments. These example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of the invention. The following detailed description may, therefore, not to be taken as a limiting sense.

In this document, the terms "a" or "an" are used, as is common in patent documents, to include one or more than one. In this document, the term "or" is used to refer to a nonexclusive "or" such that "A or B" includes "A but not B," "B but not A," and "A and B," unless otherwise indicated.

Now referring to the figures, and more specifically to FIG. 1, a system 100 is provided for improving personality traits, in accordance with an embodiment. The system 100 may be hosted by a data processing device, and preferably by a mobile data communication device. Examples of a mobile data communication device include, but are not limited to, smart phone, smart watch, tablet, phablet and laptop, among others. The data processing device may include at least one processor and a memory module, which are used by the system 100. System 100 includes an application module 102 and a database module 104. The application module 102 is executed by the processor, and the database module 104 is stored in the memory module. The application module 102 executed on the processor is configured to communicate with the database module 104 to save or retrieve data using a communication bus.

The application module 102 may include a logging module 106, an assessment module 108, a fine tuning module 110 and a user interface module 112.

The database module 104 may include a personality trait database 114 and an action database 116. The personality trait database 114 may include a list of personality traits, such as stress 118a, anxiety 118b, fear 118c and anger 118d, among others. The personality traits may mean and include one or more human traits and emotional traits. Each personality trait 118 may be associated with an information page 120, an alternate trait suggestion module 122, a trait equation 124 and an action sequencing logic 126.

The information page 120 may include information corresponding to the trait. The information corresponding to the trait may include information corresponding to reasons causing the trait, symptoms corresponding to the trait, impact of the trait on a person and other traits that may be confused with the instant trait, among other information. The information the information page 120 relates.

The alternate trait suggestion module 122 corresponding to a trait 118 includes a list of one or more traits other than the instant trait 118, which may be selected by a user. Table 1 below provides an exemplary list of traits, and alternative traits for each trait in the list.

TABLE 1

| Traits | Alternate trait |
| --- | --- |
| Pessimism | Depression, Happiness |
| Worry | Anxiety, Stress |
| Empathy | Relationships |
| Depression | Pessimism, Happiness |
| Anxiety | Worry, Sorry Anxiety, Stress |
| Social Anxiety | Anxiety |
| Stress | Anxiety, Worry |
| Anger | Aggression |
| Aggression/Violence | Anger |
| Relationships | Trust, Empathy |
| Submissiveness | Social Anxiety |
| Self Esteem | Depression, social anxiety, submissiveness |
| Self control | Aggression, Anger |
| Trust | Relationships |
| Happiness | Pessimism, Depression |

The trait equation 124 for the trait 118 includes an equation for determining current status of the trait. An exemplary trait equation is provided below:

$$T_V = T_1 + \text{Min}(E_{Hmax}, E_H) + \text{Min}(E_{Mmax}, E_M)$$

$$E_H = h_1 * \frac{H_1}{100} + h_2 * \frac{H_2}{100} + h_3 * \frac{H_3}{100} + \ldots$$

$$E_M = m1\left(\frac{1}{2}\right)^{\frac{r1}{r1half}} + m2\left(\frac{1}{2}\right)^{\frac{r2}{r2half}} + m3\left(\frac{1}{2}\right)^{\frac{r3}{r3half}} + \ldots$$

$$H_1 = a1\left(\frac{1}{2}\right)^{\left(\frac{ta1}{th1half}\right)} + a2\left(\frac{1}{2}\right)^{\left(\frac{ta2}{th1half}\right)} + a3\left(\frac{1}{2}\right)^{\left(\frac{ta3}{th1half}\right)} + \ldots$$

Where, $T_v$: Current trait value; $T_1$: User defined trait value;
$E_{Hmax}$: Maxium effectiveness of doing only physical and dietary actions;
$E_{Mmax}$: Maximum effectiveness of doing only mind and brain actions;
$E_H$: Current effectiveness of all physical and dietary actions performed by user;
$E_M$: Current effectiveness of all mind and brain actions performed by user;
h1, h2 and h3 are the weightage for the hormones;
H1, H2 and H3 are the current absolute percentage changes from the normal level of hormones;
a1, a2, a3 are the initial percentage increase of the hormone for its corresponding physical or food action;
ta1, ta2, ta3 are the elapsed time from the time each of the respective actions (a1 a2, a3) was taken;
th1half is the half life or deterioration of the hormone's (H1) effect on the trait;

m1, m2, m3 are the initial percentage improvement in the trait for its corresponding mind action;

t1, t2, t3 are the elapsed time from the time each of the respective actions (m1, m2, m3) was taken; and t1half, t2half, t3half are the half life or deterioration of the actions (m1, m2, m3) effect on the trait The action sequencing logic 126 includes instructions that may enable the application module 102 to suggest one or more actions to be performed to improve the trait 118.

The action database 116 includes a list of actions that may be associated with at least one of a physical action, a mind action, a dietary action and a brain action. Actions, for example can be, meditation 128*a*, exercise 128*b* and drinking black tea 128*c*, among others. An action, such as exercise 128*b* may be physical actions; meditation 128*a* may be mind actions; and drinking black tea 128*c* may be dietary action. Each action 128 may be associated with an information page 130, a cue page 132, effect on one or more hormones 134 and effect on mind corresponding to one or more traits 136, among others.

The action associated with the physical action changes one or more hormone levels. Further while executing the physical action the energy expended in the body is more compared to the energy expended in the brain. Similarly, the action associated with the mind action may involve thinking about the specific trait in a way which may change the structure of the brain by changing the Axons, Receptors and/or the number of Neurons. Actions associated with the brain action may involve exercising the brain, fix example, by way of playing a video game or solving a puzzle, among others. The action associated with the dietary action is adding or deleting specific foods which changes one or more hormone levels.

The information page 130 may include information corresponding to the action 128, such as methodology of performing an action and preparation, among others. The information may be in the form of one or more of text, image, video and audio.

The cue page 132 or an action page may provide information about when and where the action may be performed. The cue page 132 or the action page may further include information about the advantage(s) of performing the action.

Effect on one or more hormones 134 may include values, such as numeric values reflecting the impact of performing the action on one or more hom10nes. The value(s) may be used in the trait equation. Similarly, effect on mind corresponding to one or more traits 136 may include values, such as numeric values reflecting the impact of performing the action on the mind in relation to one or more trait(s). The value(s) may be used in the trait equation.

The user interface module 112 of the application module 102 is configured to enable a user to interact with the application 102. The user interface 112 allows the user to provide input to the application module 102. Further, the application module 102 provides information and/or instructions to the user via the user interface.

The logging module 106 of the application module 102 enables logging of the actions performed by the user. The logging module 106 includes a list of actions performed by the user and the time of performing the actions.

In an embodiment, the user provides an input that an action has been performed. Such input is used to log the action in the logging module 106. Alternatively, the logging module 106 is configured to automatically log the performance of an action, upon detection that the action has been performed. For example, the application module 102 may provide an action such as solving a quiz. As soon as the quiz is solved or attempted to be solved, the performance of the action may be logged in the logging module 106.

The assessment module 108 of the application module 102 is configured to determine the current status of a selected trait 118. The assessment module 108 uses the information in data in the logging module 106, trait equation 124 corresponding to the trait 118, the effect on one or more hormones 134 and effect on mind corresponding to one or more traits 136 of the actions 128 performed, to determine the current status of the selected trait 118.

The fine tuning module 110 is configured to reconfigure the effectiveness of one or more actions 128 on trait(s) 118 for future computation of status of the trait(s) 118. The reconfiguration may be based on the difference between a user's perception of the status of a trait 118 and the status of the trait 118 as computed by the assessment module 108.

Figure 2:
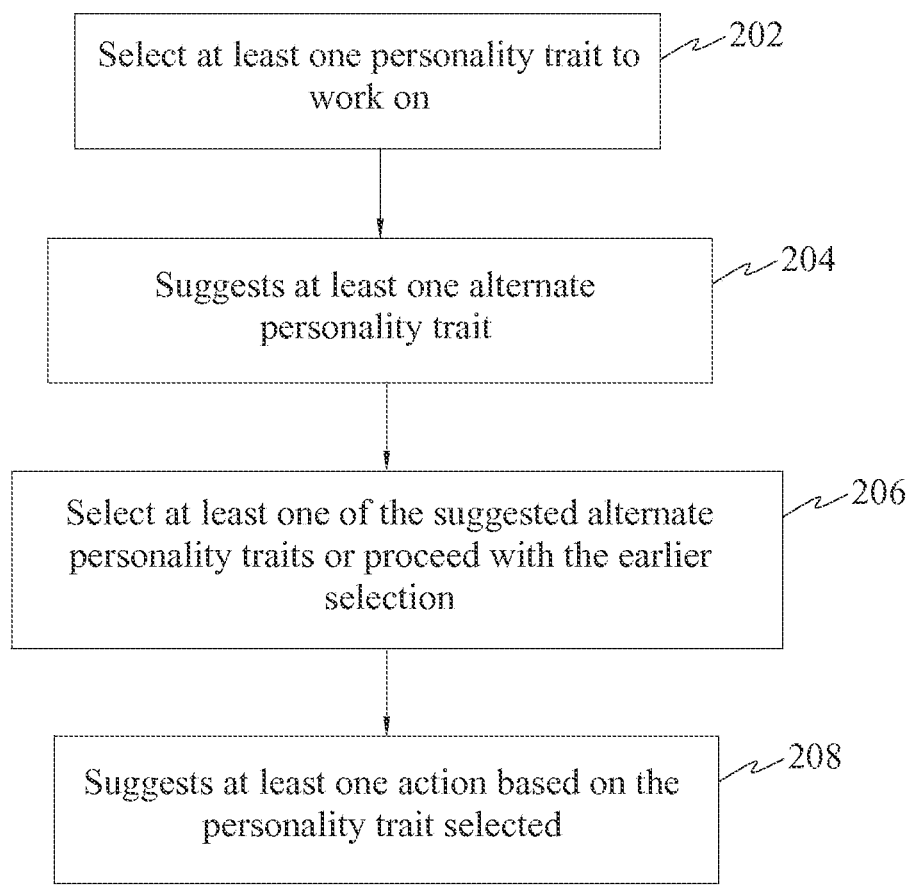
FIG. 2 is flowchart of a method for improving a personality trait, in accordance with an embodiment.
Figure 3A:
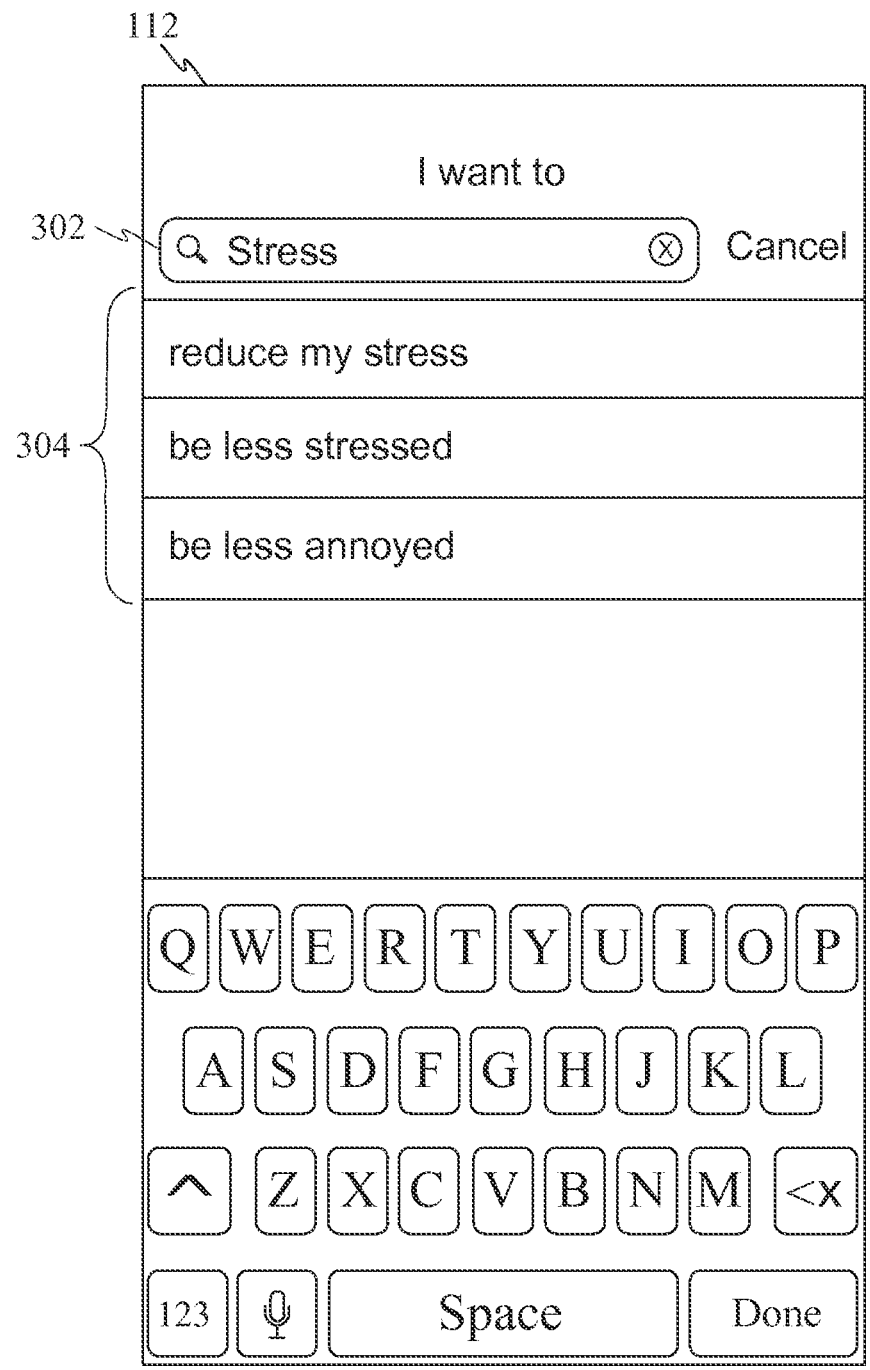
Figure 3B:
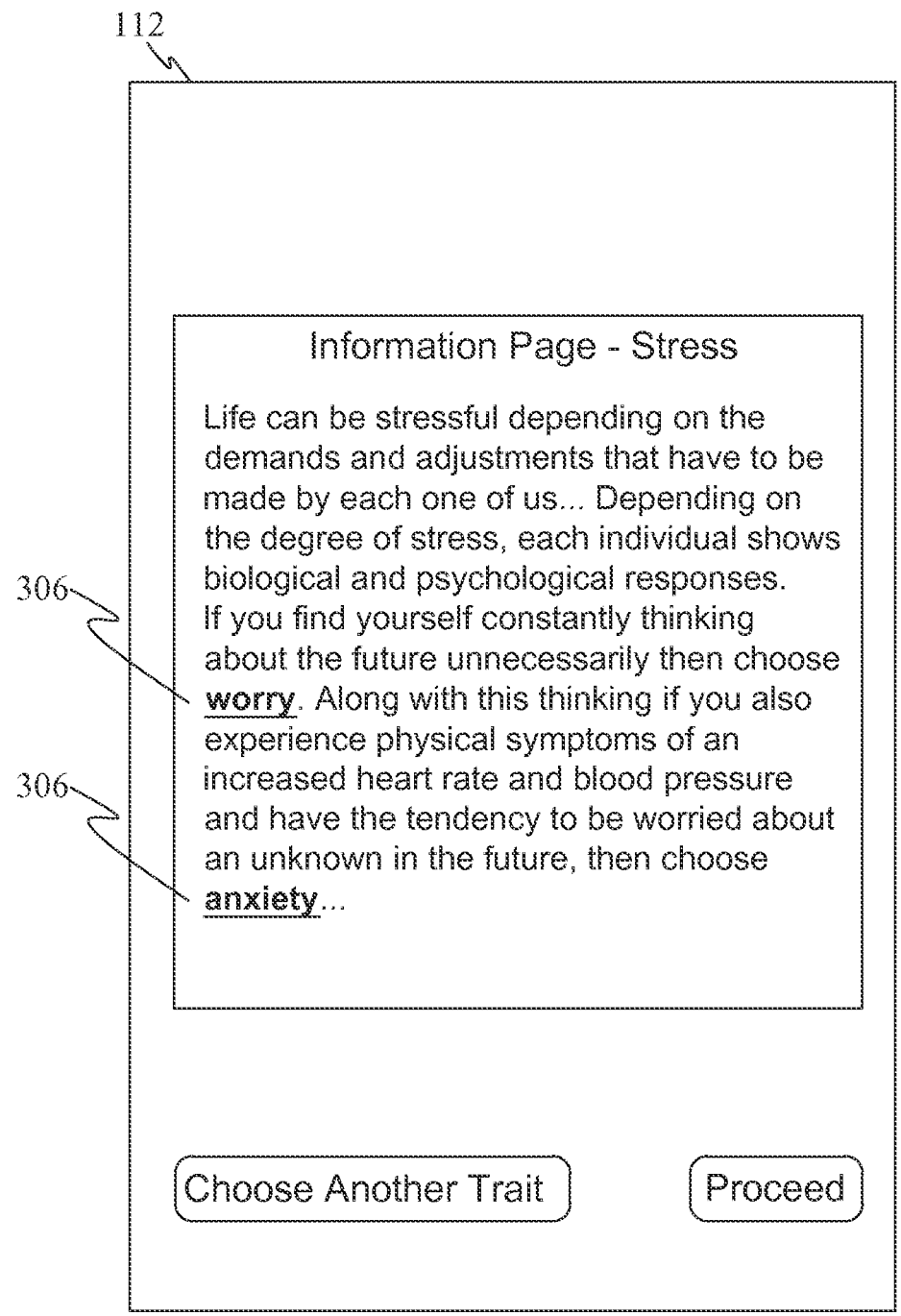
FIG. 3B illustrates a user interface 112 displaying an information page associated with a trait "stress"

Referring to FIG. 2, a method for improving a personality trait 118 is provided, in accordance with an embodiment. At step 202, a user selects a trait 118 to work on. The user interface 112 provides an option to the user for selecting at least one personality trait 118 from the plurality of personality traits 118 present in the personality trait database 114. The personality trait may be something that has existed over a substantial duration, and may have been moulded by reason of his genes and/or environment he is subjected to. For example, fear may be trait that the user wishes to work on, and the instant trait of being fearful may have existed over a substantial span, and may not be something he is experiencing at a particular instance (ex: being afraid upon spotting a tiger). Referring to FIG. 3A, the user interface 112 provides a search box 302 that enable a user to enter a search query for selecting a trait he wishes to work on. A user may provide "stress" as a search query. The user interface 112 upon receiving the query may provide a list of few relevant suggestions 304. The instant figure illustrates a list of exemplary suggestions provided for the query "stress". The suggestions/search results may include "reduce my stress", "be less stressed" and "be less annoyed", among many others. The user may selects a personality trait, such as "stress", by selecting "reduce my stress" presented in the search result 304. Upon selecting the personality trait "reduce my stress", the application module 102 configures the user interface 112 to navigate to an information page 120 associated with the trait 118, which in this example is stress. In FIG. 3B the user interface 112 is displaying an information page 120 associated with the trait 118 "stress". The information corresponding to the trait may include information corresponding to reasons causing the trait, symptoms corresponding to the trait and impact of the trait on a person. At step 204, the application module 102 suggests at least one alternate personality trait for selection based on the personality trait selected by the user. In an embodiment, the information page 120 suggests alternate personality traits 306 that may be related or confused with the instant trait. For example, the alternative personality traits 306 suggested for "stress" may be "anxiety" and "worry". Further, the user interface 112 provides an option to allow selection of at least one of the suggested alternate personality traits "anxiety" or "worry". At step 206, the application module 102 allows selection of at least one of the suggested alternate personality traits or proceeding with the earlier selection. At step 208, the application module 102 suggests at least one action based on the personality trait selected by the user, wherein the action is to cause an improvement in the selected personality trait of the user.

Figure 3C:
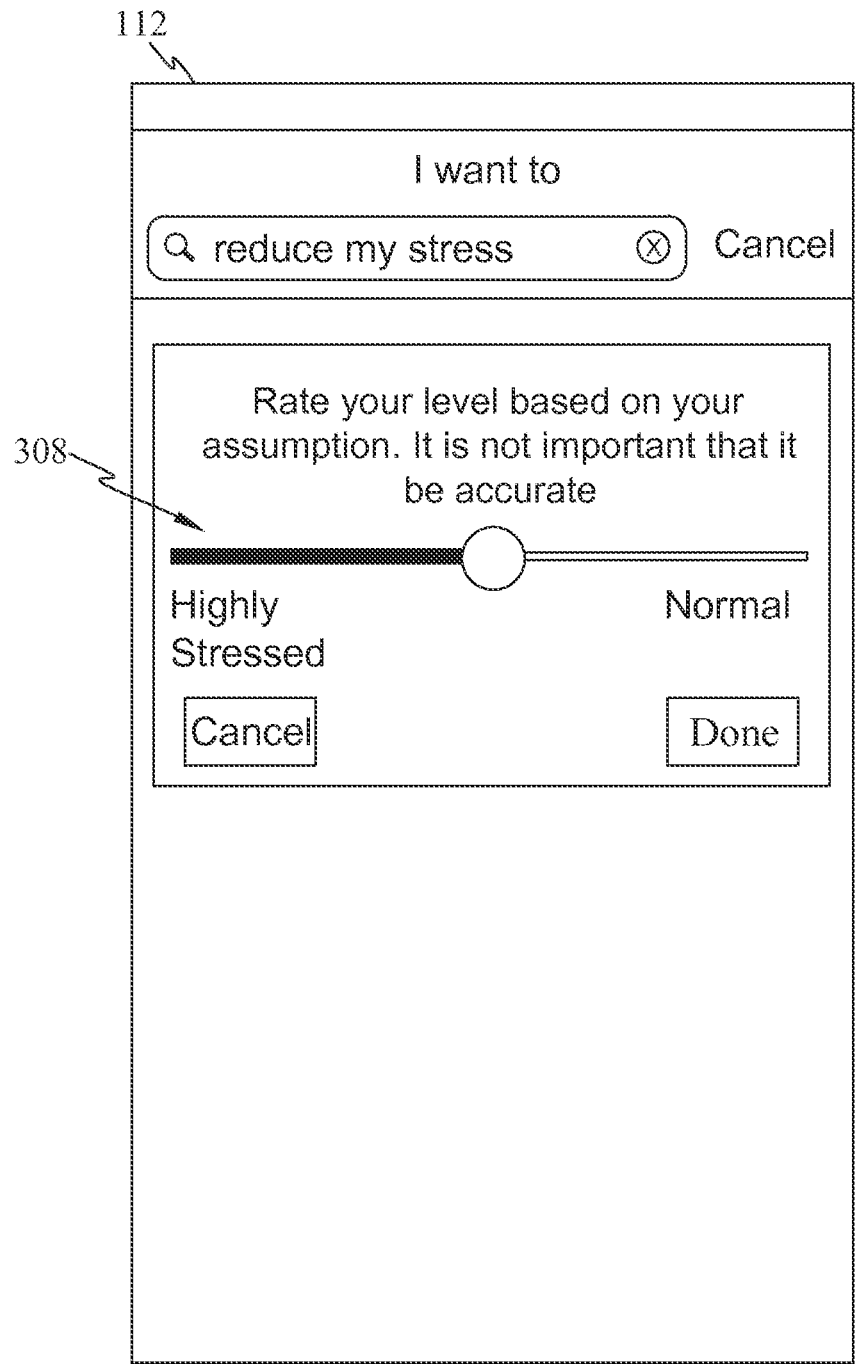
FIG. 3C illustrates a user interface 112 displaying a scale 308 that is operable by a user to select a position on the scale 308 indicative of the user's perception of his character corresponding to a selected personality trait "stress"

In an embodiment, upon selecting a personality trait at step 206, the application module 102 provides a scale operable by the user to select a position on the scale. The position may be indicative of the user's perception of his character corresponding to the selected personality trait. Referring to FIG. 3C, the user interface 112 displays a scale 308 that is operable by the user to select a position on the scale 308 indicative of the user's perception of his character corresponding to the selected personality trait "stress".

Figure 3D:
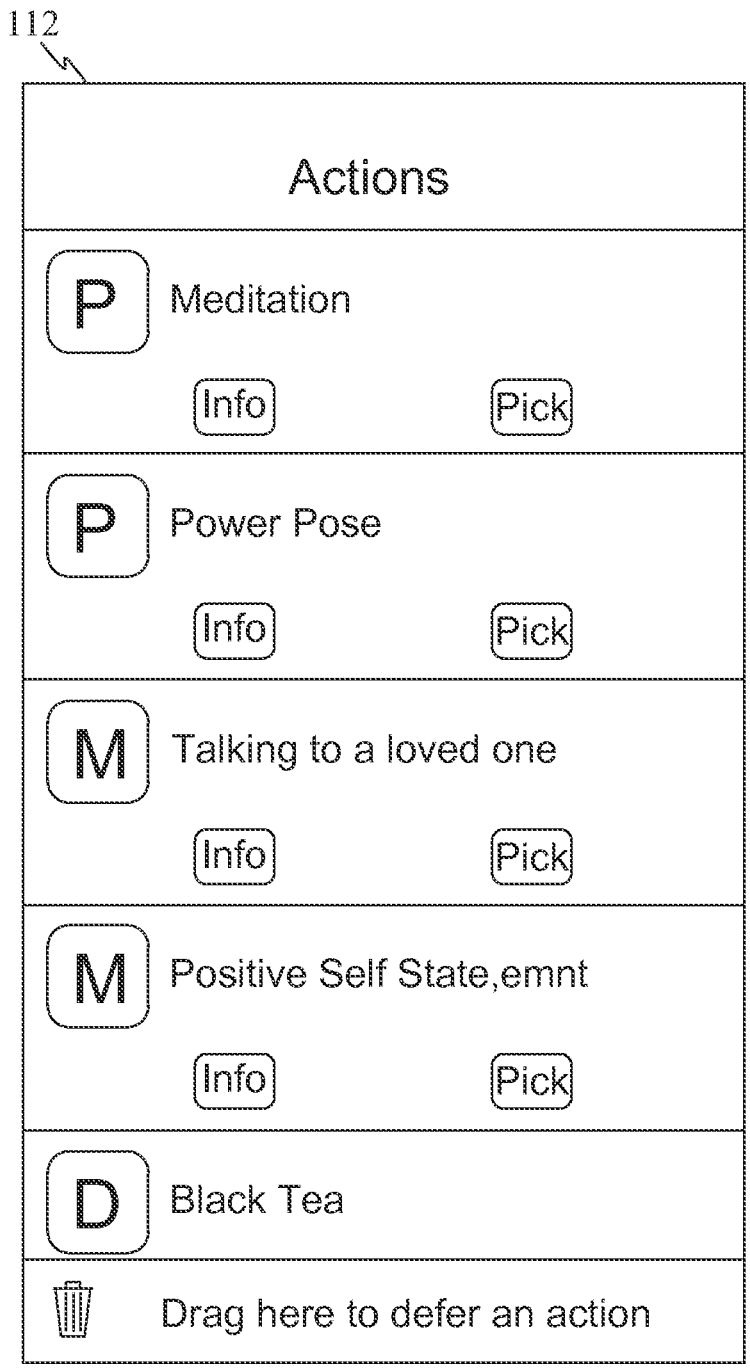
FIG. 3D illustrates a user interface 112 displaying a list of actions 310 to choose from to reduce stress.

As recited earlier, the application module 102 suggests at least one action based on the personality trait selected by the user, wherein the action is to cause an improvement in the selected personality trait of the user. Referring to FIG. 3D, the user interface 112 is displaying a list of actions to choose from to reduce stress. In this example, the actions suggested by the application module 102 for stress reduction are meditation, power pose, talking to a loved one, positive self and black tea. Each of the action suggested may be associated with at least one of physical action 'P', brain action 'B', mind action 'M' and dietary action 'D'. The application module 102 suggests the actions based on the action sequencing logic 126 associated with the selected trait. The action sequencing logic 126 may includes instructions to suggest actions based on one or more criteria, such as, but not limited to, simplicity of performing each of the actions, effectiveness of each of the actions in changing the status of the selected personality trait, trait equation 124 associated with the selected trait, status of the selected trait and the actions which have been previously executed by the user.

The user interface 112 allows the user to select one or more of the suggested actions. In an embodiment, the application module 102 enforces restriction on the type of actions that the user may select. The restriction may be based on previously selected/performed actions and the type of action that may have to be performed, based on the trait equation 124, to improve the selected trait. Further, the restriction may be at least based on effect of hormones on the personality trait and effect of mind on the personality trait, which is also reflected in the trait equation 124.

In an embodiment, the user is provided with an option to defer the suggested action in the user interface 112. The application module 102 upon receiving the decision to defer an action that is suggested, the application module 102 retrieves at least one alternative action to be suggested for the user to improve the status of the selected personality trait.

Figure 3E:
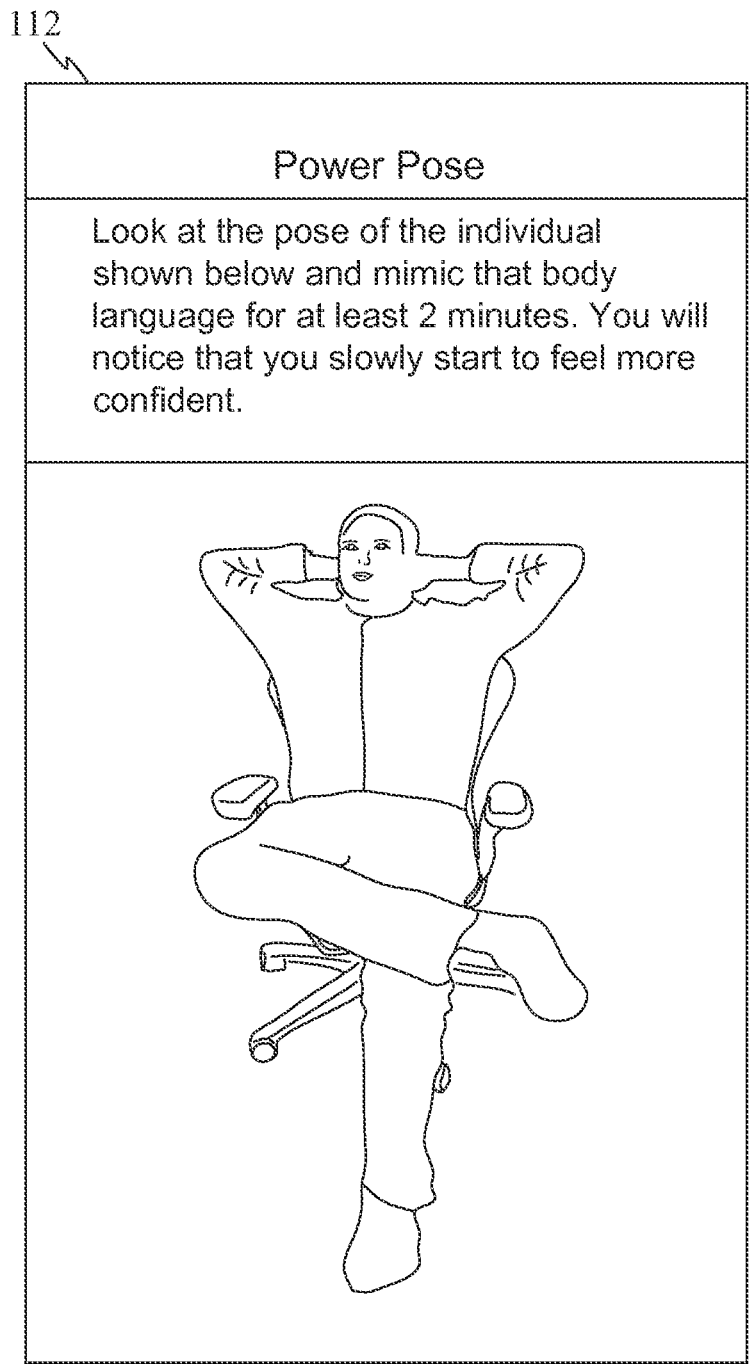
FIG. 3E illustrates a user interface 112 displaying an information page associated with an action "power pose"

The application module 202 configures the user interface 112 to display all the selected actions that have to be performed. The user interface 112 may be configured to allow a user to access the information page 130 associated with each of the actions. Referring to FIG. 3E, the user interface 112 is displaying an information page 130 associated with the action "power pose". Additionally, the application module 102 may provide motivational information associated with each of the actions.

The user interface 112 may be further configured to allow the user to prepare a schedule for preforming each of the actions, access the cue page 132 associated with each of the actions, and log the performance of each of the actions, which is logged in the logging module 106.

Figure 4:
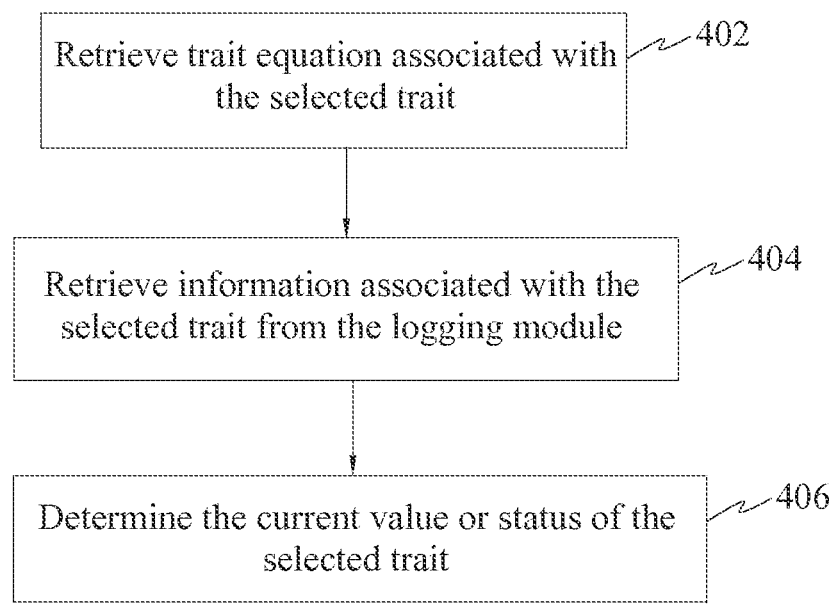
FIG. 4 is a flow chart of a method for determining status of a selected trait, in accordance with an embodiment.

Referring to FIG. 4, a method for determining status of a selected trait is provided, in accordance with an embodiment. At step 402, the application module 102 retrieves the trait equation 124 associated with the selected trait. Further, at step 404, the application module 102 retrieves information associated with the selected trait from the logging module 106. The information retrieved from the logging module may include initial or user defined value of the selected trait, actions performed by the user and the time of performing each of the actions. Additionally, at step 406, the application module 102 applies the trait equation 124 to determine the current value or status of the selected trait. The status or current value may be reflected on the scale.

In an embodiment the application module 102 enables a user to modify or alter a position indicating status of a trait on the scale, from a position determined by the assessment module 108. The application module 102 calibrates future computation of status of traits based on the difference between the application module 102 determined position and the user altered position.

It shall be noted that the processes described above is described as sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention. Thus the scope of the invention should be determined by the appended claims and their legal equivalents rather than by the examples given.

The invention claimed is:

1. A system comprising at least one processor and a memory storing instructions for improving personality traits, wherein the system further comprises a data store containing two or more sets of personality trait information about two or more personality traits, respectively, the at least one processor configured to present at least one digital page containing content taken from the two or more sets of personality trait information, the at least one processor further configured to:
provide an option to a user for selecting at least one personality trait from the personality traits;
identify, from an input, information about an original assessment of the selected personality trait, wherein the original assessment is indicative of an original level of the selected personality;
suggest actions including a physical action, a mind action, and a brain action, the suggested actions based on the personality trait selected by the user, wherein the suggested actions are to cause an improvement in the selected personality trait, in which the content presented on the at least one digital page, taken from a set of the two or more sets of personality trait information and corresponding to the selected personality trait, facilitates performance by the user of the suggested mind action or the suggested brain action; and
allow the user to select one or more actions from the suggested actions, wherein the at least one processor is further configured to enforce restriction of type of actions that the user can select at least based on effect of hormones on the selected personality trait and effect of mind on the selected personality trait;
wherein each set of the two or more sets includes at least one prediction value for a corresponding trait of the two or more personality traits, each prediction value indicative of a predicted impact of an action of the suggested actions, and wherein the at least one processor is further configured to:
deterministically modify a value associated with the original assessment based on 1) information about which one(s) of the suggested actions are performed by the user and 2) using a selected one of the two or more predefined sets of values; and
provide an updated assessment of the selected personality trait based on said deterministically modifying.

2. The system according to claim 1, wherein the at least one processor is further configured to:
suggest at least one alternate personality trait for selection based on the selected personality trait; and
allow selection of at least one of the suggested alternate personality traits or proceed with the earlier selection.

3. The system according to claim 1, wherein the at least one processor is further configured to provide a scale operable by the user to select a position on the scale, wherein the input is received in response to a selection of the position on the scale by the user.

4. The system according to claim 1, wherein the actions are suggested further based on at least one of simplicity of performing the actions, effectiveness of each of the actions in changing a status of the selected personality trait, a trait equation associated with the selected personality trait and actions which have previously executed by the user.

5. The system according to claim 1, wherein the original assessment comprises a user defined position of a status of the selected personality trait, and wherein the at least one processor is further configured to determine status of the selected personality trait by considering the user defined position of the status of the selected personality trait, actions performed by the user among the suggested actions, effectiveness of the actions performed by the user on the selected personality trait and deterioration of impact of the actions on the selected personality trait.

6. The system according to claim 5, wherein the at least one processor is further configured to enable the user to alter the status of the selected personality trait from the status determined by the system.

7. The system according to claim 6, wherein the at least one processor is further configured to calibrate future determination of the status of at least the selected personality trait based on difference between the status determined by the system and the status altered by the user.

8. The system according to claim 5, wherein the deterioration of impact of an action among the actions performed by the user is based on a time elapsed since the action was performed.

9. An apparatus including at least one processor and a memory, the apparatus comprising:
a data store containing one or more sets of personality trait information about one or more personality traits, respectively;
the at least one processor to present at least one digital page containing content taken from the one or more sets of personality trait information; and
the memory storing instructions executable by the at least one processor to assess a current level of a personality trait of a person, wherein the instructions, when executed by the at least one processor, perform operations comprising:
identifying, from an input, information about an original assessment of a personality trait of the person, wherein the original assessment is indicative of an original level of the personality trait of the person;
suggesting actions including a physical action, a mind action, and a brain action, the suggested actions based on the personality trait of the person;
wherein the suggested actions are to cause an improvement in the personality trait of the person, in which content presented on the at least one digital page, taken from a set of the one or more sets of personality trait information and corresponding to the personality trait of the person, facilitates performance by the person of the suggested mind action or the suggested brain action;
allowing the person to select one or more actions from the suggested actions;
wherein the at least one processor enforces restriction on type of actions that the person can select at least based on effect of hormones on the personality trait and effect of mind on the personality trait;
wherein the data store retains one or more predefined sets of values corresponding to the suggested actions, wherein each predefined set of values includes at least one prediction value for a corresponding trait of the one or more personality traits, each prediction value indicative of a predicted impact of an action of the suggested actions; and
wherein the operations further include:
deterministically modifying a value associated with the original assessment based on 1) information about which one(s) of the suggested actions are performed by the person and 2) using a selected one of the one or more predefined sets of values; and
providing an updated assessment of the personality trait of the person based on said deterministically modifying.

10. The apparatus of claim 9, wherein the updated assessment of the personality trait of the person comprises a first updated assessment, and wherein the operations further include:
identifying a second updated assessment of the personality trait from an input received over a user interface;
generating calibration data based on a comparison of the first and second updated assessments; and
storing the generated calibration for use in a future computation of an updated assessment of the personality trait of the person.

11. The apparatus of claim 9, wherein the one or more personality traits comprise a plurality of personality traits, wherein the operations further comprise:
providing an option to the person for selecting at least one personality trait from the plurality of personality traits;
suggesting at least one alternate personality trait for selection based on the personality trait selected by the person; and
allowing selection of at least one of the suggested alternate personality traits or proceed with the earlier selection.

12. The apparatus according to claim 9, wherein the operations further include suggesting at least one alternate action upon the person deferring at least one of the suggested actions.

13. A method comprising:
providing a processor and a memory storing instructions that, when executed by the processor, perform operations including:
- providing 1) a digital scale operable by a user to select a position on the digital scale, and 2) at least one digital page containing content taken from one or more sets of personality trait information about one or more personality traits, wherein the position on the digital scale is indicative of the user's perception of his character corresponding to an identified personality trait of the one or more personality traits;
- suggesting actions including a physical action, a mind action, and a brain action, the suggested actions based on the identified personality trait;
- wherein the suggested actions are to cause an improvement in the identified personality trait, in which the content presented on the at least one digital page, taken from a set of the one or more sets of personality trait information and corresponding to the identified personality trait, facilitates performance by the user of the suggested mind action or the suggested brain action;
- allowing the user to select one or more actions from the suggested actions;
- wherein the processor enforces restriction on type of actions that the user can select at least based on effect of hormones on the identified personality trait and effect of mind on the identified personality trait;
- wherein each set of the one or more sets includes at least one prediction value for a corresponding trait of the one or more personality traits, each prediction value indicative of a predicted impact of an action of the suggested actions, wherein the operations further include:
- deterministically modifying a value associated with the position on the digital scale based on 1) information about which one(s) of the suggested actions are performed by the user and 2) using a selected one of the one or more predefined sets of values;
- provide an updated assessment of the identified personality trait based on said deterministically modifying;
- allowing the user to alter the determined current status of the identified personality trait; and
- calibrating future determination of the status of the identified personality trait based on difference between the determined current status and the status altered by the user.

14. The method according to claim 13, wherein determining the current status of the identified personality trait further comprises considering deterioration of impact of one(s) of the suggested actions that are performed by the user.

* * * * *